United States Patent [19]
Tamura et al.

[11] Patent Number: 5,594,980
[45] Date of Patent: Jan. 21, 1997

[54] ELECTRIC WIRE PRODUCING CONTROL DEVICE AND ELECTRIC WIRE MEASURING AND CUTTING APPARATUS INCLUDING THE CONTROL DEVICE

[75] Inventors: Yoshikazu Tamura; Kengo Oono; Toshikatsu Yamashiro, all of Kanazawa, Japan

[73] Assignee: Sumitomo Wiring Systems, Ltd., Yokkaichi, Japan

[21] Appl. No.: 337,382

[22] Filed: Nov. 8, 1994

[30] Foreign Application Priority Data

Nov. 12, 1993 [JP] Japan .................................. 5-283667

[51] Int. Cl.⁶ .......................... H01R 43/00; G06F 15/46
[52] U.S. Cl. ....................... 29/33 M; 29/755; 364/468.01
[58] Field of Search ...................... 29/33 M, 755, 29/593, 747, 564.1, 564.4, 564.6; 364/468, 469

[56] References Cited

U.S. PATENT DOCUMENTS

| | | | |
|---|---|---|---|
| 4,677,734 | 7/1987 | Bloch et al. | 29/564.2 |
| 5,125,154 | 6/1992 | Cross | 29/564.1 X |
| 5,153,839 | 10/1992 | Cross | 29/33 M |
| 5,198,983 | 3/1993 | Blake et al. | 29/747 X |
| 5,398,561 | 3/1995 | Tamura | 29/593 X |
| 5,483,459 | 1/1996 | Tamura | 29/755 |

FOREIGN PATENT DOCUMENTS

| | | |
|---|---|---|
| 508695 | 10/1992 | European Pat. Off. .................. 29/755 |
| 4-270020 | 9/1992 | Japan . |
| 5-6774 | 1/1993 | Japan . |
| 5-250935 | 9/1993 | Japan . |
| 2235065 | 2/1991 | United Kingdom . |
| 2239325 | 6/1991 | United Kingdom . |
| 2248945 | 4/1992 | United Kingdom . |

*Primary Examiner*—William R. Briggs
*Attorney, Agent, or Firm*—Beveridge, DeGrandi, Weilacher & Young, LLP

[57] ABSTRACT

In the present invention, wire producing data is recorded on a production label 60 using a bar code. Prior to operating an apparatus, an operator inputs bar codes on a plurality of production labels 60 to a control section 51 by a bar code reader 41. In the control section 51, wire producing data corresponding to the bar codes are read out of a memory 72, and the wire producing data are stored in an FIFO table 521. If the operation is started, the wire producing data stored in the FIFO table 521 are read out in the order stored, and the driving of a processor 11 is controlled in accordance with the contents of the wire producing data. Accordingly, the processor 11 can be continuously operated by first inputting the plurality of bar codes, thereby to make it possible to produce measured and processed electric wires efficiently.

18 Claims, 9 Drawing Sheets

FIG. 8

FIFO TABLE 521

| AREA | CONTENTS |
|---|---|
| 1 | WIRE PRODUCING DATA A (LENGTH OF CUTTING, NUMBER OF ELECTRIC WIRES PRODUCED ···) |
| 2 | WIRE PRODUCING DATA B ··· |
| 3 | WIRE PRODUCING DATA C ··· |
| 4 | WIRE PRODUCING DATA D ··· |
| ⋮ | |

ELECTRIC WIRE PRODUCING CONTROL DEVICE AND ELECTRIC WIRE MEASURING AND CUTTING APPARATUS INCLUDING THE CONTROL DEVICE

BACKGROUND OF THE INVENTION

1. Field of the Invention

The present invention relates to an electric wire measuring and cutting apparatus for measuring the length of an electric wire, cutting the electric wire to predetermined lengths, stripping insulative sheaths in both ends of the cut electric wire, and crimping terminals against both the ends of the electric wire to produce measured and processed electric wires which are constituent elements of a wiring harness.

2. Description of the Prior Art

A wiring harness incorporated in an automobile, a copying machine or the like is constructed by binding a lot of electric wires each having a predetermined length by cutting and having terminals crimped against its ends (hereinafter referred to as "measured and processed electric wires" in the specification). In order to produce measured and processed electric wires which are constituent elements of such a wiring harness, an electric wire measuring and cutting apparatus for cutting an electric Wire to predetermined lengths, stripping insulative sheaths in both ends of the cut electric wire and crimping terminals against both the ends of the electric wire has been known (see Japanese Unexamined Patent Publication No. 270020/1992).

Furthermore, an apparatus having a so-called intermediate portion stripping mechanism further added to the above described electric wire measuring and cutting apparatus has been filed as a prior application (see Japanese Unexamined Patent Publication No. 250935/1993).

When measured and processed electric wires are produced by the above described electric wire measuring and cutting apparatus according to the prior art, the control of the processor must be changed if the conditions of production are changed. In some cases, an electric wire must be replaced, or terminals or applicators for terminal crimping must be replaced. For example, consider a case where $Q_1$ of measured and processed electric wires having a length $L_1$ are produced from an electric wire of A and then, $Q_2$ of measured and processed electric wires having a length $L_2$ are produced from the same electric wire of A. In this case, control of the timing of cutting by the apparatus, for example, must be changed depending on a case where the former measured and processed electric wires having a length $L_1$ are produced and a case where the latter measured and processed electric wires having a length $L_2$ are produced.

Furthermore, consider a case where $Q_2$ of measured and processed electric wires having a length $L_2$ are produced from the above described electric wire of A and then, $Q_3$ of measured and processed electric wires having a length $L_3$ are produced from an electric wire of B and subsequently, $Q_4$ of measured and processed electric wires are produced from an electric wire of C. In this case, the contents of control of the apparatus must be respectively changed. Moreover, the electric wire must be replaced. In some cases, terminals or applicators for terminal crimping must be replaced as the electric wire is replaced.

Processing for setting different contents of control in one electric wire measuring and cutting apparatus as the conditions of production are thus changed is required several times a day. The reason for this is that one electric wire measuring and cutting apparatus generally produces several tens of kinds of measured and processed electric wires a day.

In the conventional electric wire measuring and cutting apparatus, therefore, every time measured and processed electric wires to be produced are changed, the contents of control required to produce the measured and processed electric wires are inputted. The contents of control are inputted by operating a lot of switches, buttons and the like provided for the electric wire measuring and cutting apparatus. Therefore, it takes a lot of time and labor for rearrangement in terminating the production of certain measured and processed electric wires and then, starting the production of the subsequent measured and processed electric wires, resulting in inferior operability.

SUMMARY OF THE INVENTION

The present invention has been made in view of the prior art and has for its object to provide a control device reducing time and labor required for rearrangement work in an electric wire measuring and cutting apparatus.

Another object of the present invention is to provide an electric wire measuring and cutting apparatus comprising an improved control device and a processor driven by the control device.

In accordance with an aspect, the present invention provides an electric wire producing control device being characterized by comprising reading means for reading wire producing data which is recorded on a record medium, data storing means capable of storing a plurality of wire producing data and assigning, when the wire producing data is read from the record medium by the reading means, the wire producing data its priority for reading and storing the wire producing data, and control means for sequentially reading out the plurality of wire producing data stored in the data storing means in the order of descending priorities for reading and carrying out control of production processing of electric wires on the basis of each of the wire producing data read out.

According to the present invention, if the wire producing data which is recorded on the record medium is read by the reading means, the wire producing data is stored in the data storing means. The plurality of wire producing data are read by the reading means, thereby to make it possible to store the plurality of wire producing data in the data storing means. In the data storing means, the wire producing data are assigned priorities for reading and are stored. The control means sequentially reads out the wire producing data stored in the data storing means in the order of descending priorities for reading, to carry out control of production processing of electric wires on the basis of each of the wire producing data. Therefore, the plurality of wire producing data are previously stored in the data storing means, thereby to make it possible to sequentially carry out control of production processing of a plurality of types of electric wires continuously.

Furthermore, in accordance with a preferred mode of the present invention, the wire producing data is recorded on predetermined paper using a bar code. Accordingly, it is easy to manage the record medium, and it is possible to read the wire producing data by a bar code reader quickly and accurately.

In accordance with another mode of the present invention, the wire producing data itself is previously registered in a wire producing data file. To each of the wire producing data, an index code for identifying the wire producing data is attached. On the other hand, only the index code is recorded on the record medium. If the index code recorded on the record medium is read by the reading means, the wire producing data file is accessed, and the wire producing data to which the index code is attached is read out of the wire producing data file and is stored in the data storing means such as a processing register. In this case, the stored wire producing data are assigned priorities for processing. The control means sequentially reads out the wire producing data in the order of descending priorities for reading, to carry out control of production processing of electric wires. Since the contents recorded on the record medium include only the index code and the wire producing data itself having a large amount of information is not recorded on the record medium, therefore, it is possible to simplify recording on the record medium. Consequently, it does not take time for the reading means to read the index code recorded on the record medium, and a reading error hardly occurs.

In accordance with still another mode of the present invention, the data storing means can comprise a so-called FIFO memory. Therefore, it is possible to simplify the construction of the storing means.

Furthermore, according to an electric wire measuring and cutting apparatus comprising the electric wire producing control device according to the present invention, it is not necessary to input subsequent wire producing data for each rearrangement as in the conventional electric wire measuring and cutting apparatus. A plurality of data can be previously inputted together, thereby to make it possible to input data efficiently. Further, at the time of control, the wire producing data are read out in a desired order, and control is carried out on the basis of the read wire producing data. Even if the conditions of production are changed, the subsequent wire producing data is read out to continue the control, thereby to make it possible to produce measured and processed electric wires efficiently.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is an illustration of an FIFO table; and

DESCRIPTION OF THE PREFERRED EMBODIMENTS

Figure 1:
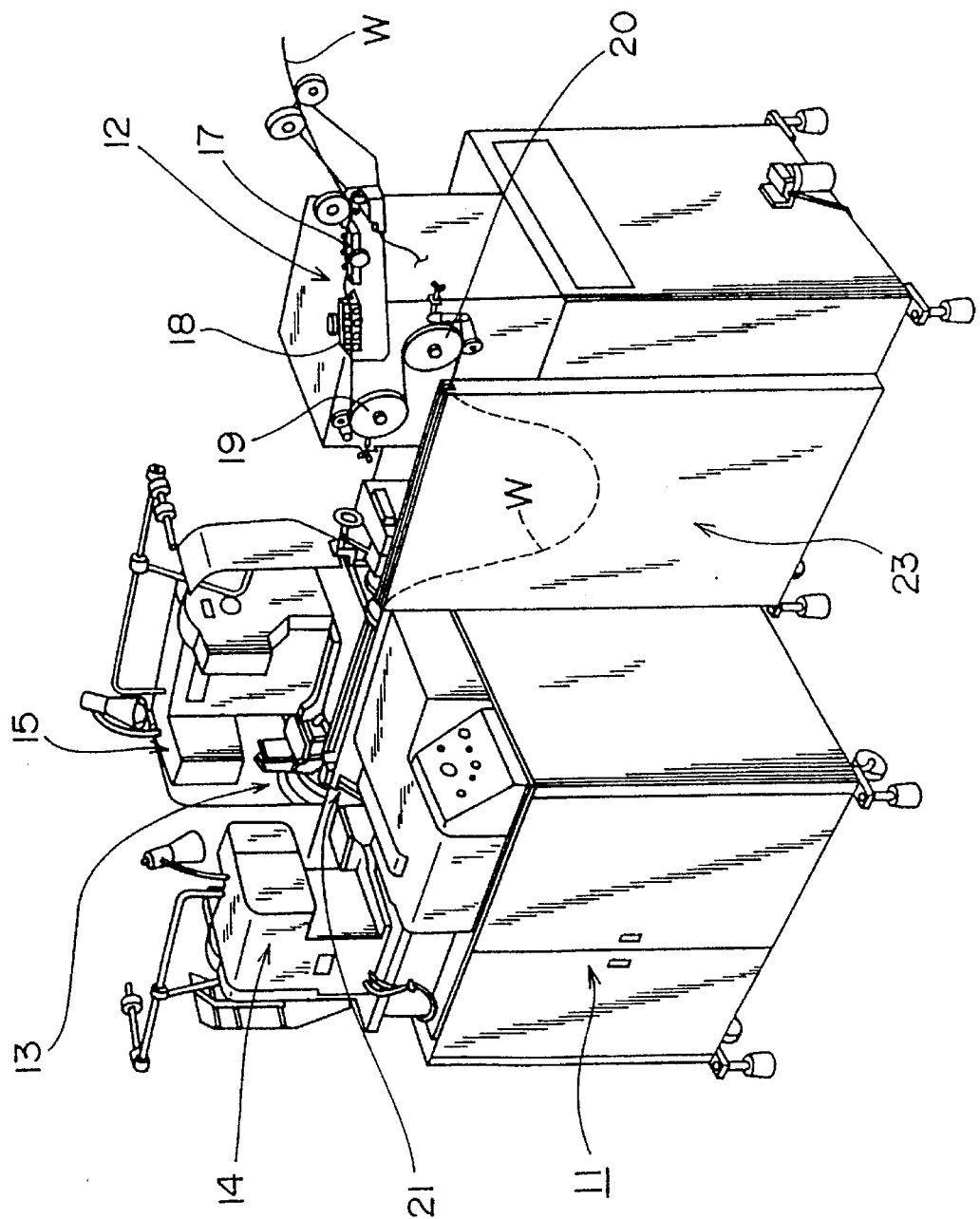
FIG. 1 is a perspective view showing a processor 11 which is a component of an electric wire measuring and cutting apparatus according to one embodiment of the present invention.

FIG. 1 is a perspective view showing a processor 11 which is a component of an electric wire measuring and cutting apparatus according to one embodiment of the present invention.

Referring to FIG. 1, the processor 11 comprises a measured length feeding section 12, a cutting and stripping section 13, a first terminal crimper 14, and a second terminal crimper 15.

The habit of winding of an electric wire W fed to the processor 11 is first corrected in the measured length feeding section 12, and the amount of conveyance of the electric wire W (the length of the electric wire W fed) is measured. Therefore, the measured length feeding section 12 comprises a horizontal straightener 17 and a vertical straightener 18 for correcting the curling of the electric wire W, a first feed roller 19, and a second feed roller 20 which is synchronized with the first feed roller 19. In addition, an encoder (not shown) is connected to the second feed roller 20, to measure the amount of conveyance of the electric wire W.

The electric wire W fed by the measured length feeding section 12 is applied to the cutting and stripping section 13, where the electric wire W is so cut as to have a predetermined length at a predetermined time. Insulative sheaths in the front end and the rear end of the cut electric wire are further removed. The front end of the electric wire from which the insulative sheath is removed is applied to the first terminal crimper 14 by a turning arm mechanism 21, where a terminal is crimped thereon. On the other hand, the rear end of the electric wire from which the insulative sheath is removed is applied to the second terminal crimper 15 by an index table (not shown), where a terminal is crimped thereon.

The processor 11 further comprises an electric wire pool section 23. The electric wire pool section 23 is provided in an electric wire feeding path between the measured length feeding section 12 and the cutting and stripping section 13. The electric wire W is continuously conveyed by the measured length feeding section 12 at constant speed. On the other hand, cutting and stripping processing of the electric wire W in the cutting and stripping section 13 is performed with the electric wire W stopped. Therefore, the electric wire pool section 23 is so provided that the feeding of the electric wire W by the measured length feeding section 12 need not be stopped even when the front end of the electric wire W is stopped in the cutting and stripping section 13. The electric wire W fed by the measured length feeding section 12 hangs slack, as indicated by a broken line, in the electric wire pool section 23. Consequently, the feeding of the electric wire W by the measured length feeding section 12 need not be interrupted frequently.

According to the present invention, the above described processor 11 shown in FIG. 1 may be replaced with a processor comprising an intermediate portion stripping mechanism as described in Japanese Unexamined Patent Publication No. 250935/1993 filed as a prior application by the applicant of the present invention.

Figure 2:
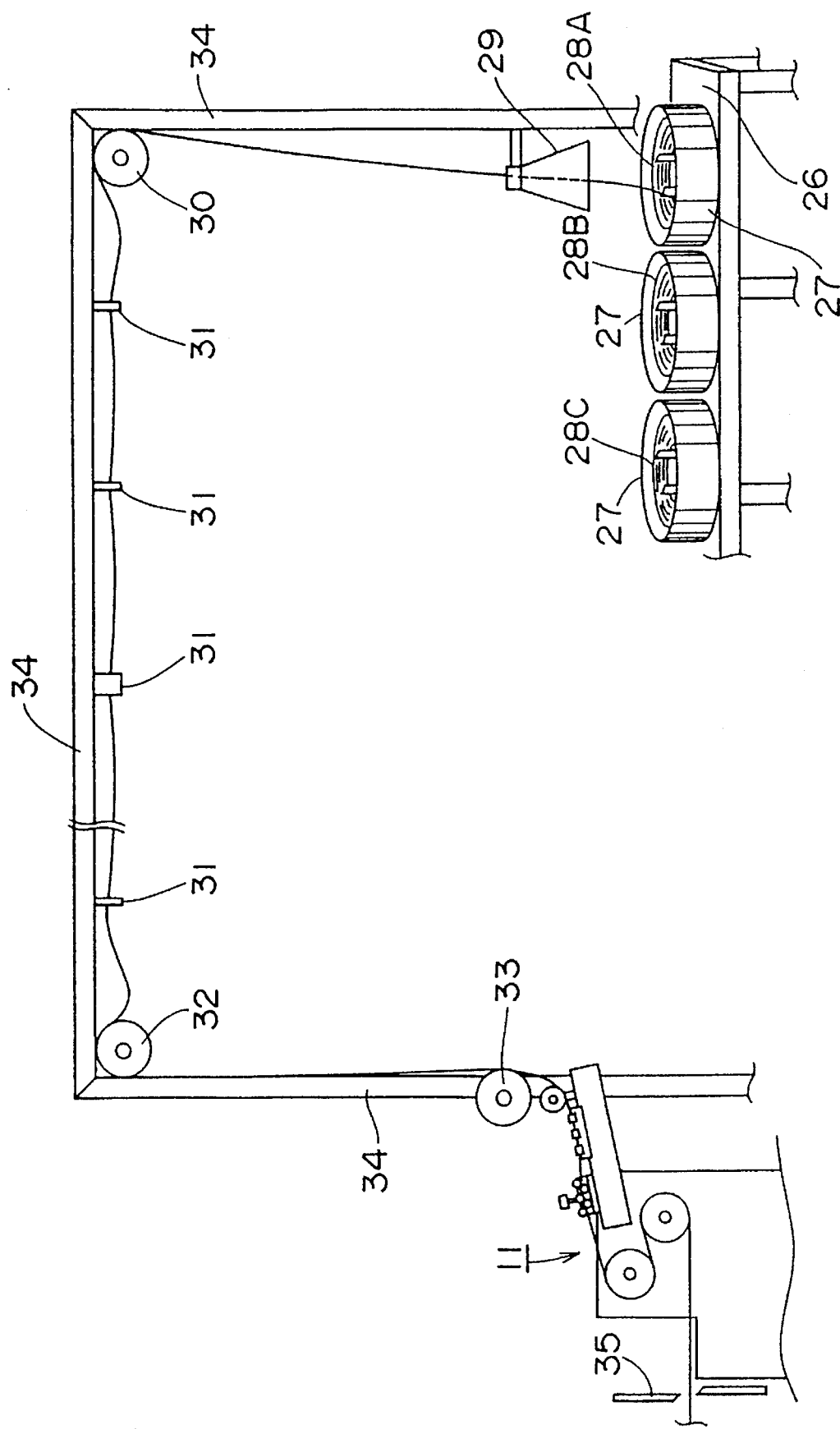
FIG. 2 is an illustration for explaining the construction of a pass line.

FIG. 2 is a diagram showing an example of the construction of a pass line in the electric wire measuring and cutting apparatus according to one embodiment of the present invention.

Referring to FIG. 2, wound electric wires 28A, 28B, 28C respectively contained in containers 27 are arranged on an electric wire arrangement table 26. The wound electric wires 28A, 28B and 28C differ in types, diameters, colors, etc. Since the electric wire measuring and cutting apparatus produces various kinds of measured and processed electric wires, the electric wire of a desired type is selected from the wound electric wires 28A, 28B and 28C arranged on the arrangement table 26.

For example, if the wound electric wire 28A is selected, the wound electric wire 28A is guided by a guide wrapper 29, a roller 30, a plurality of guide members 31 and rollers 32 and 33 to the processor 11. The rollers 30, 32, and 33 and the guide members 31 are provided along a guide bar 34.

Figure 3:
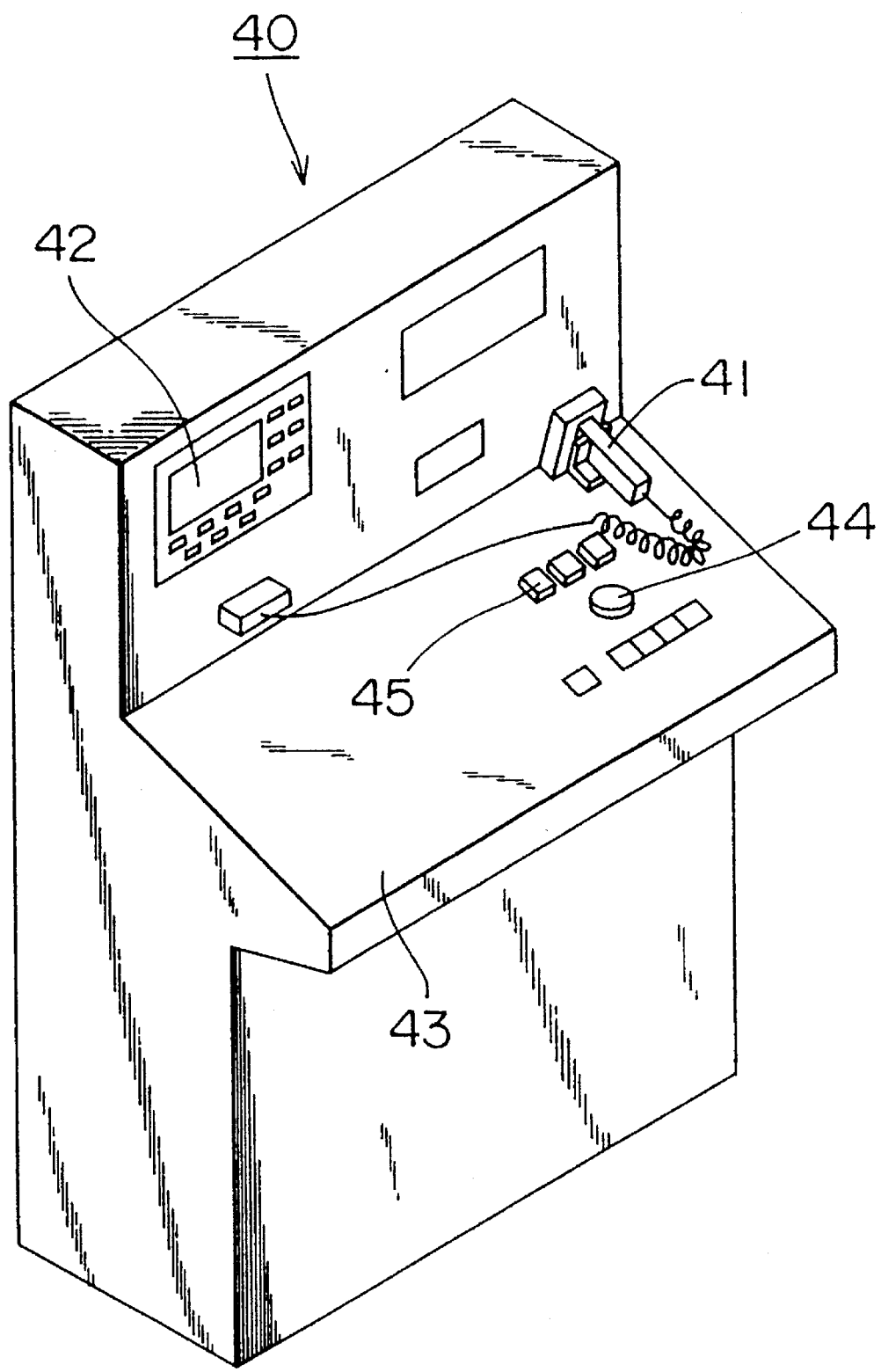
FIG. 3 is a perspective view showing the appearance of a control device 40 which is a component of the electric wire measuring and cutting apparatus according to one embodiment of the present invention.

FIG. 3 is a perspective view showing the appearance of a control device 40 which is another component of the electric wire measuring and cutting apparatus according to one embodiment of the present invention. The control device 40 is connected to the above described processor 11 (see FIG. 1) for controlling the driving of the processor 11.

The control device 40 comprises a bar code reader 41. The bar code reader 41 reads, from predetermined paper on which a bar code as described later is recorded (commonly referred to as a "production label"), the bar code. The control device 40 further comprises a display 42. The display 42 is for displaying wire producing data corresponding to the bar code read by the bar code reader 41, the contents of instructions at the time of replacing an electric wire as described later, and the like. In addition, a working table 43 is formed in the control device 40 so that a worker can easily perform work. Various operation buttons including a start button 44 and an initial button 45 are arranged on the working table 43.

Figure 4:
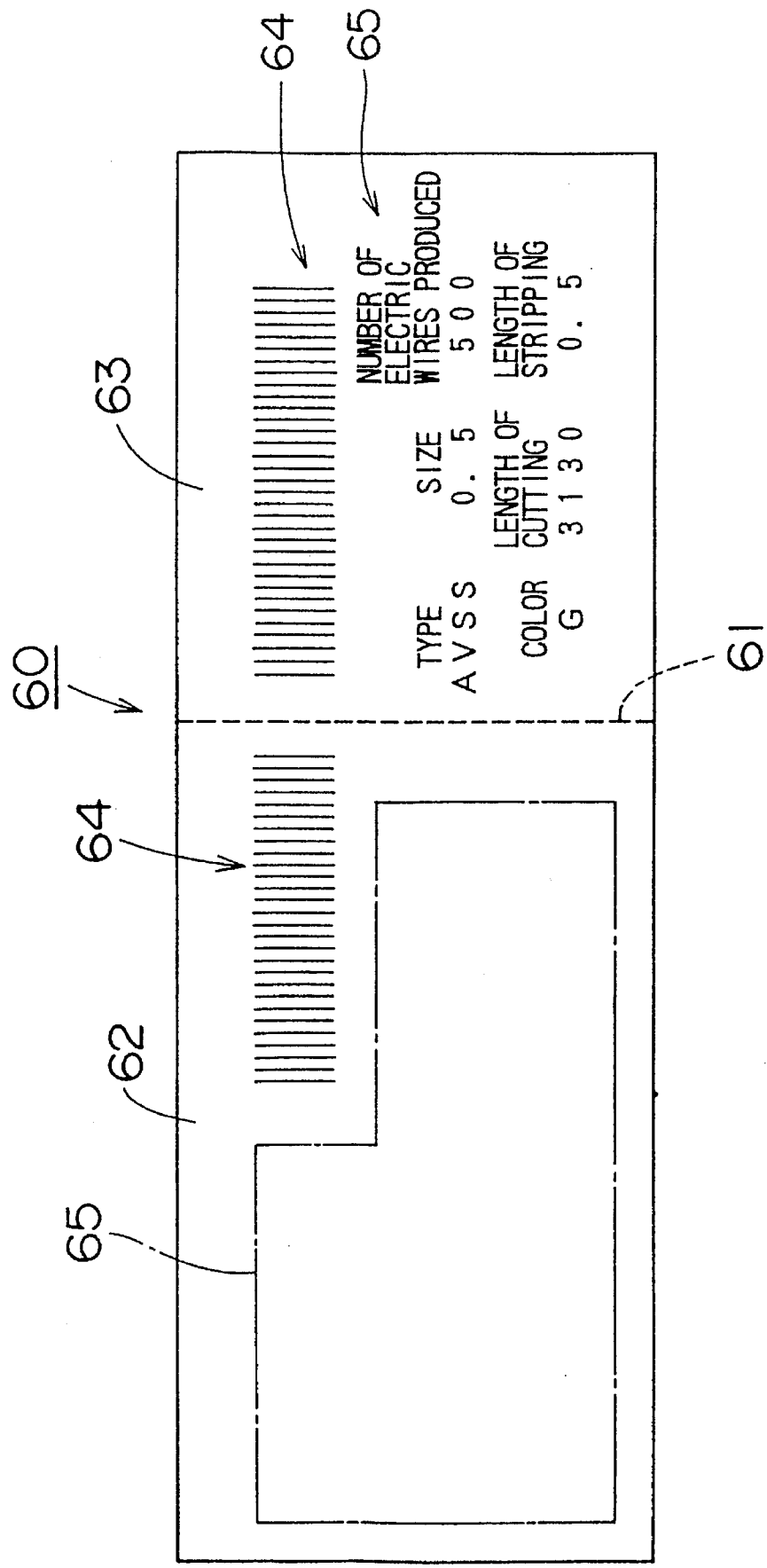
FIG. 4 is an illustration showing one example of an so-called "production label"

FIG. 4 is a diagram showing one example of predetermined paper on which the above described bar code is recorded, that is, a production label. A production label 60 can be divided into a half stub of the label 62 and the other half stub of the label 63 by a perforation 61. Wire producing data 65 are respectively recorded on the half stub of the label 62 and the other half stub of the label 63. The wire producing data 65 is data required to produce electric wires including the type of electric wire which is processed by the processor 11, the color of the electric wire, the size of the electric wire (the cross-sectional area of the core of the electric wire), the length of cutting, the number of measured and processed electric wires to be produced, the length of stripping, the type of terminals to be crimped against both ends of the electric wire, the presence or absence of intermediate stripping, and the like. The wire producing data 65 is recorded by ordinary letters, numbers, signs and the like so that it can be confirmed with the eyes of the worker. An index code attached so as to identify the wire producing data 65 is recorded using a bar code 64 in relation to the wire producing data 65. The index code recorded using the bar code 64 is composed of a numerical value of approximately 5 to 10 figures, for example.

The bar code 64 recorded on the production label 60 is read by the bar code reader 41 described in FIG. 3 and is inputted to the control device 40.

Thereafter, if measured and processed electric wires are produced, the other half stub of the label 63 in the production label 60 is left as a duplicate for work in the hands of the worker, for example, and the half stub of the label 62 is attached to the measured and processed electric wires produced and is utilized as a label of the measured and processed electric wires.

Figure 5:
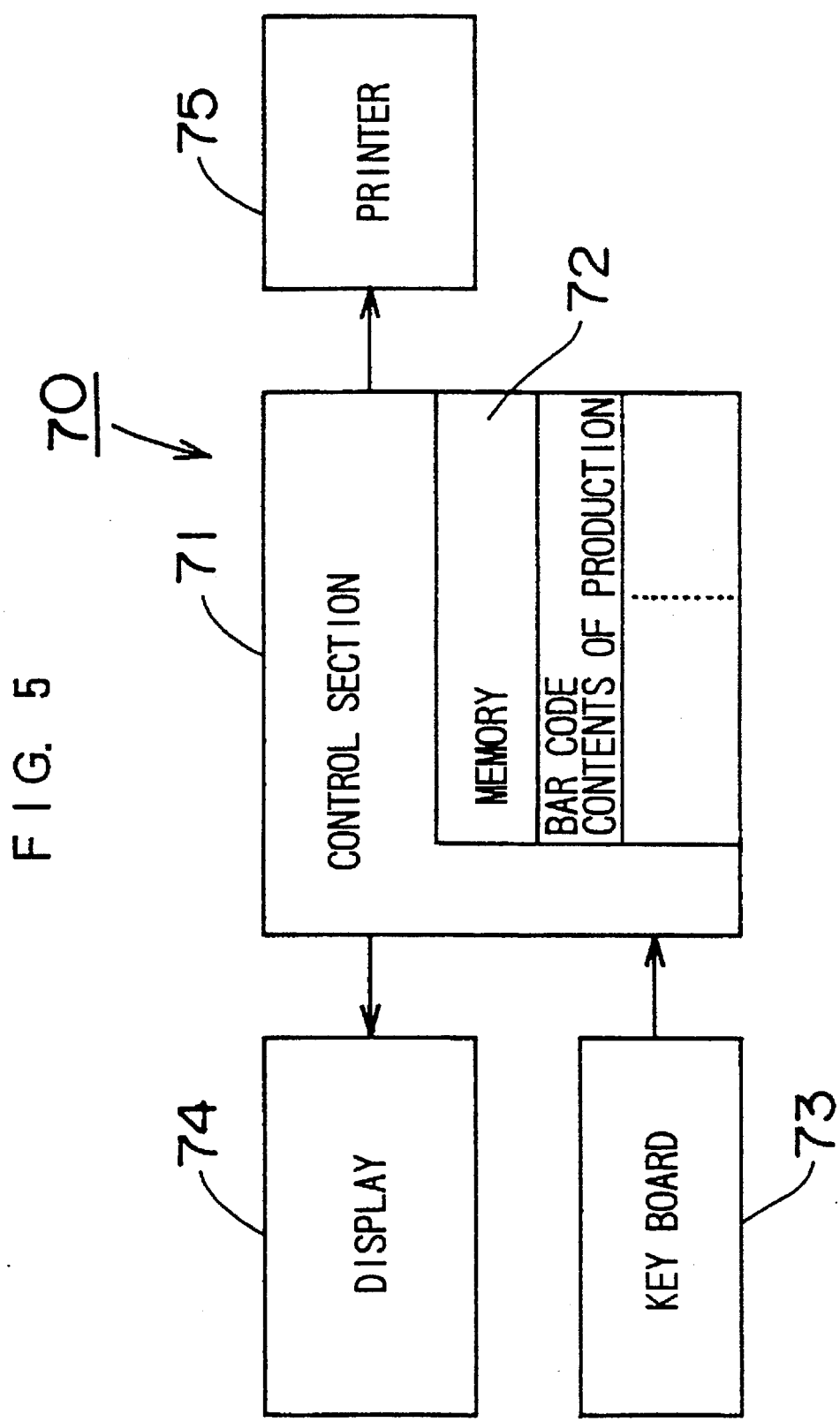
FIG. 5 is a block diagram showing an example of the construction of a wire producing data file for issuing a production label.

FIG. 5 is a block diagram showing the schematic construction of a wire producing data file 70 for registering the wire producing data and issuing the above described production label 60, for example, an office computer. The wire producing data file 70 comprises a control section 71. The control section 71 stores a program for issuing a production label. The control section 71 further comprises a memory 72. Wire producing data registered and an index code attached to the wire producing data are stored in the memory 72.

The wire producing data file 70 comprises a key board 73, a display 74, and a bar code printer 75.

Figure 6:
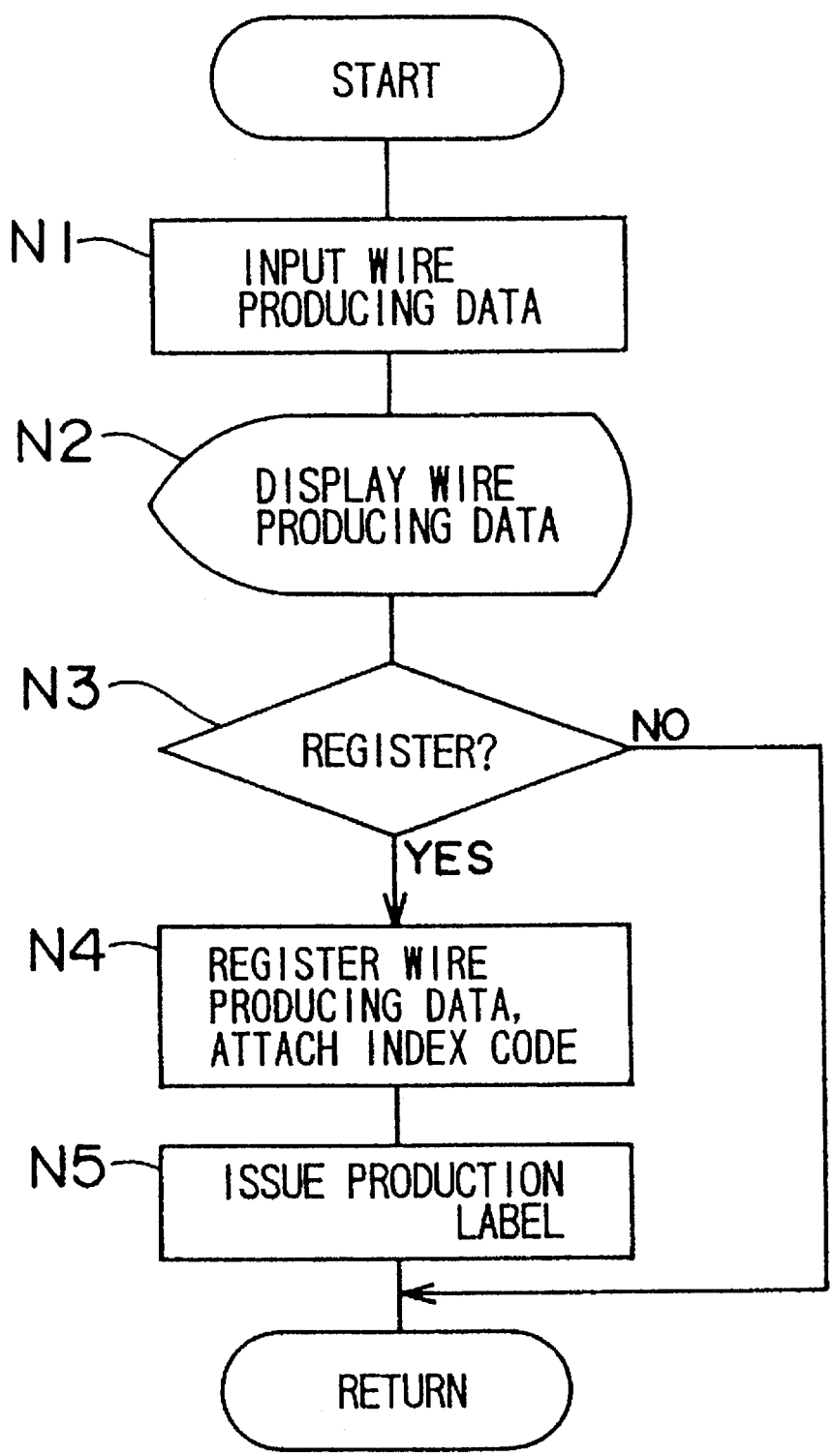
FIG. 6 is a flow chart showing operations of the wire producing data file shown in FIG. 5.

FIG. 6 is a flow chart showing operations for registering wire producing data and issuing a production label in the wire producing data file 70 shown in FIG. 5. Description is made of operations of the wire producing data file 70 shown in FIG. 5 in accordance with the flow of FIG. 6.

Wire producing data is first inputted from the key board 73 (step N1). The wire producing data includes the type of electric wire processed, the color of the electric wire, the size of the electric wire (the cross-sectional area of the core of the electric wire), the length of the electric wire, the number of measured and processed electric wires to be produced, the length of stripping on both ends of the electric wire, the type of terminals to be crimped against the ends of the electric wire, the type of applicators used, the presence or absence of intermediate portion stripping, and the like. The order in which wire producing data are inputted is displayed on the display 74, for example. Accordingly, an operator inputs the wire producing data from the key board 73 while watching the display on the display 74.

The wire producing data inputted are displayed on the display 74 (step N2).

The operator who inputs the wire producing data from the key board 73 confirms the wire producing data displayed on the display 74 and presses a register key (not shown) of the key board 73 so as to register, if there is no error in the wire producing data, the contents of the wire producing data. On the other hand, the operator corrects, if there is an error in the wire producing data, the wire producing data and then, presses the register key.

In the control section 71, if input from the register key is provided (step N3), an index code is attached to the wire producing data inputted (step N4). The wire producing data and the index code are registered (stored) in the memory 72.

The above described "input of wire producing data" can be provided by the wire producing data file 70 reading a plurality of wire producing data previously stored in a storage device such as a disk or directly transmitting wire producing data previously stored in different computers to the wire producing data file 70 by connection between the computers.

Thereafter, a production label on which the wire producing data is printed and the index code attached thereto is printed using a bar code by the driving of the printer 75 (step N5).

As described in the foregoing, the wire producing data is registered, the index code is attached to the registered wire producing data, and the production label on which the index code is recorded is issued from the wire producing data file 70. Therefore, if only one wire producing data file 70 is provided in one office or factory, and production labels applied to control devices 40 in a plurality of electric wire measuring and cutting apparatuses are together issued from the wire producing data file 70 and are managed, it is possible to grasp the conditions of production of the plurality of electric wire measuring and cutting apparatuses under the management of the wire producing data file 70 correctly and synthetically.

Figure 7:
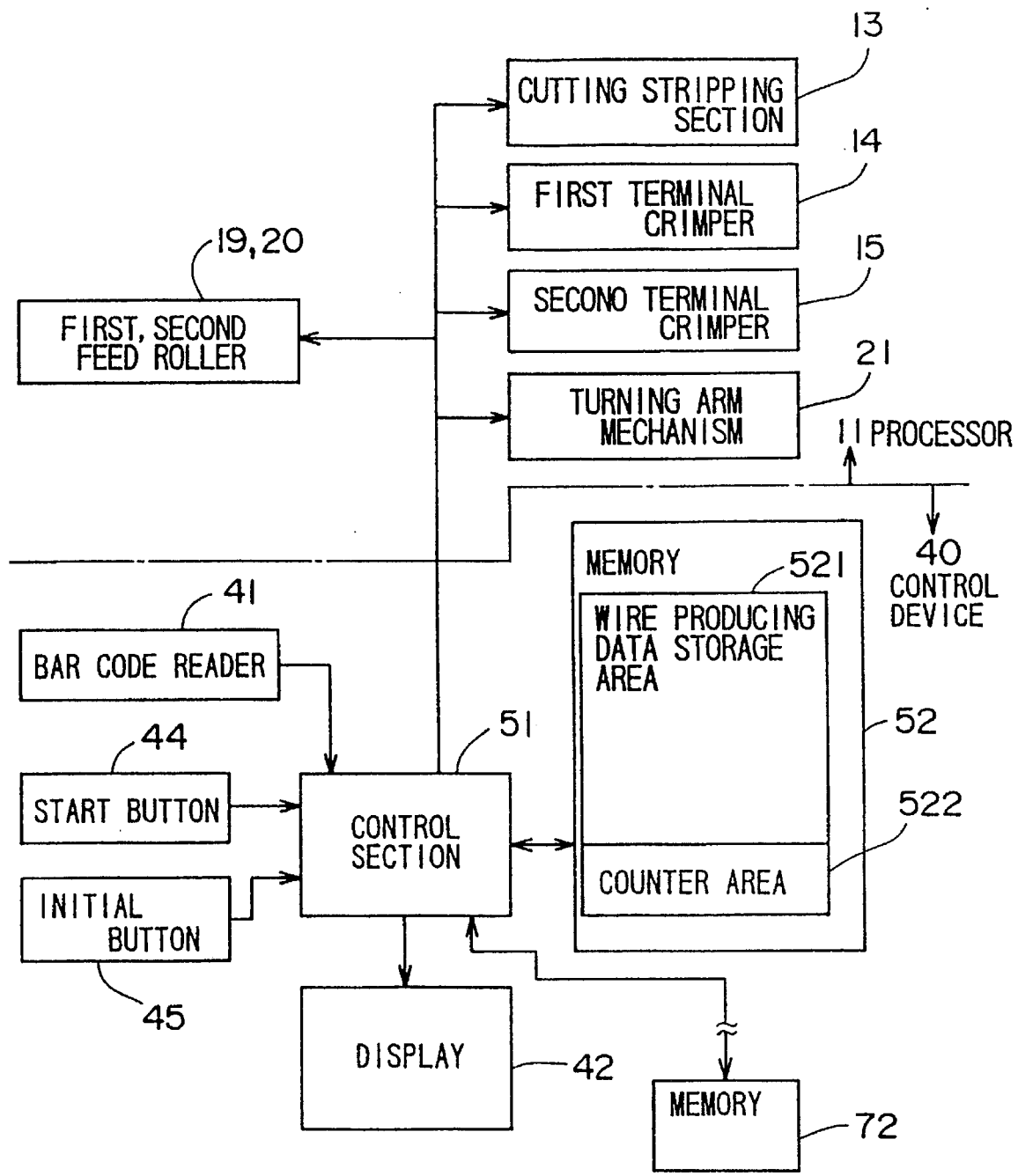
FIG. 7 is a block diagram showing the construction of the electric wire measuring and cutting apparatus according to one embodiment of the present invention.

FIG. 7 is a block diagram showing the construction of the electric wire measuring and cutting apparatus according to one embodiment of the present invention. The electric wire measuring and cutting apparatus comprises a control section 51 for carrying out control of the entire apparatus. The control section 51 is provided in the above described control device 40 and is constituted by a CPU (Central Processing Unit) and the like. An index code read by the above described bar code reader 41 and signals from the start button 44 and the initial button 45 are applied to the control section 51.

A memory 52 is connected to the control section 51. The control section 51 is further connected to a memory 72 through the control section 71 in the above described wire producing data file 70 shown in FIG. 5. If a bar code on a production label is read by the bar code reader 41 and an index code represented by the read bar code is inputted, the control section 51 accesses the memory 72 in the wire producing data file 70 shown in FIG. 5 to read out wire producing data corresponding to the index code. The wire producing data includes the length L of measured and processed electric wires to be produced, the number Q of measured and processed electric wires to be produced, and the type of electric wire, the diameter of electric wire, the color of the electric wire, and the like. The wire producing data read out of the memory 72 is stored in a wire producing data storage area 521 in the memory 52.

The wire producing data storage area 521 is constituted by an FIFO (First In First Out) table in the present embodiment. FIG. 8 is an illustration of the FIFO table 521. Referring to FIG. 8, the FIFO table 521 has a capacity for storing a plurality of wire producing data. Therefore, the memory 72 in the wire producing data file 70 (see FIG. 5) is accessed every time bar codes on a plurality of production labels are sequentially read by the bar code reader 41, and wire producing data corresponding to index codes represented by the read bar codes are read out. The wire producing data read out are sequentially stored in the FIFO table 521.

In the FIFO table 521, the wire producing data are sequentially stored in areas 1, 2, 3, 4, . . . in the order inputted. At the time of reading, the wire producing data stored in the area 1 is read out. If the wire producing data stored in the area 1 is read out, the wire producing data stored in the area 1 is erased or is moved into a processed area in the memory 72 in the wire producing data file 70. The wire producing data stored in the respective areas are shifted one by one. For example, the wire producing data stored in the area 2 is shifted to the area 1, the wire producing data stored in the area 3 is shifted to the area 2, and the wire producing data stored in the area 4 is shifted to the area 3. As a result, the wire producing data stored in the FIFO table 521 are sequentially read out in the order stored.

The FIFO table 521 may be replaced with an ordinary memory area as the wire producing data storage area 521 so that wire producing data stored are assigned priorities for reading.

As another construction, the control section 51 may be provided with an external storage medium reading device (for example, a flexible disk reader), for example, without connecting the control section 51 and the memory 72 in the wire producing data file 70 to each other as described above. In this case, it is only necessary to down load a plurality of wire producing data and index codes which are registered in the memory 72 in the wire producing data file 70 into a flexible disk, for example, and set the flexible disk in the flexible disk reader connected to the control section 51.

Referring to FIG. 7 again, the memory 52 further comprises a counter area 522 for counting the number of measured and processed electric wires produced.

The control section 51 further outputs control signals to the first and second feed rollers 19 and 20, the cutting and stripping section 13, the first terminal crimper 14, the second terminal crimper 15, the turning arm mechanism 21 and the like included in the processor 11. The display 42 is further connected to the control section 51.

Figure 9:
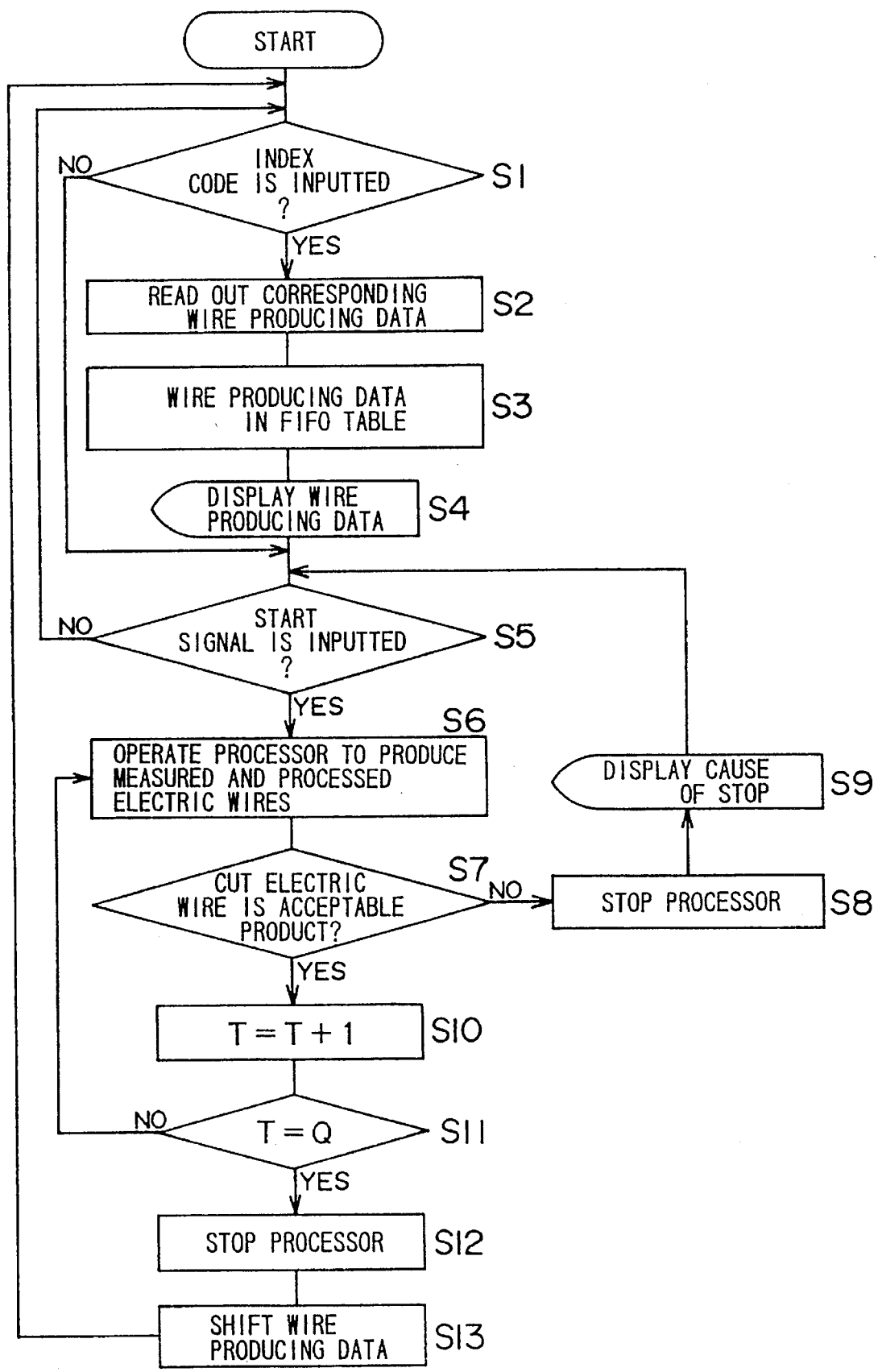
FIG. 9 is a flow chart for explaining operations of the electric wire measuring and cutting apparatus according to one embodiment of the present invention.

FIG. 9 is a flow chart showing operations of the electric wire measuring and cutting apparatus according to the present embodiment, centered around a control operation of the above described control section 51. Description is now made of the operations in the block diagram of FIG. 7 along the flow of FIG. 9.

A bar code 64 on an information label 60 (see FIG. 4) is first read by the bar code reader 41, and an index code represented by the bar code 64 is applied to the control section 51. The control section 51 accesses, if the index code is applied thereto (step S1), the memory 72 through the control section 71 in the wire producing data file 70 (see FIG. 5), and reads out wire producing data corresponding to the index code from the memory 72 (step S2). The wire producing data read out is stored in the FIFO table 521 in the memory 52 (step S3). The wire producing data read out of the memory 72 is displayed on the display 42 (step S4).

The control section 51 judges whether or not a start signal is applied by the push of the start button 44 (step S5), and performs the above described processing in the steps S2, S3 and S4 if the start signal is not applied and the index code read by the bar code reader 41 is further applied (step S1).

In this case, the wire producing data to be stored in the FIFO table 521 in the memory 52 are stored in the areas 1, 2, 3, . . . in the order stored. Consequently, the wire producing data to be read out of the FIFO table 521 are sequentially read out in the order stored.

As the procedure for reading bar codes on production labels by the above described bar code reader 41, it is preferable that a worker arranges the production labels in the order in which work efficiency rises and causes the bar code reader 41 to read the bar codes on the production labels in that order.

If the FIFO table 521 is replaced with an ordinary memory area as the wire producing data storage area 521 so that stored wire producing data can be assigned arbitrary priorities for reading, the worker can also cause the bar code reader 41 to read the bar codes on the plurality of production labels to store the wire producing data in the wire producing data storage area 521 and then, assign the wire producing data priorities for reading in an order different from the order stored. If such construction is adopted, the construction is useful for cases such as a case where it is desired to cause the bar code reader 41 to read the bar codes on the production labels to store the wire producing data and then, carry out control of the production of electric wires in an order different from the order stored.

Processing for reading out the wire producing data corresponding to the index code in the above described step S2 may be performed from a flexible disk or another memory.

Specifically, if the flexible disk reader, for example, is connected to the control section 51 and the flexible disk storing an index code and wire producing data corresponding thereto is mounted on the flexible disk reader as described above, the wire producing data is read out of the flexible disk. Alternatively, if another memory (for example, a CD-ROM) is provided in the control section 51, and an index code and wire producing data corresponding thereto are previously stored in the memory, it is possible to read out the wire producing data from the memory.

If the start button 44 is then pushed by the worker, the control section 51 judges whether or not a start signal is inputted (step S5). In order to read out the wire producing data in the area 1 in the FIFO table 521 and produce measured and processed electric wires according to the wire producing data, the processor 11 is operated (step S6).

The control section 51 judges, every time an electric wire is cut by the cutting and stripping section 13 in the processor 11, whether or not the cut electric wire is an acceptable product (step S7). The judgment can be made on the basis of image data from a checker camera provided in the cutting and stripping section 13, for example. If the cut electric wire is not an acceptable product as a result of the judgment in the step S7, the processor 11 is stopped (step S8), and the cause of the stop of the processor 11 is displayed on the display 42 (step S9). The worker watches the display on the display 42 to know that the cut electric wire is not an acceptable product, removes the electric wire which is not an acceptable product, sets the processor 11 again, and pushes the start button 44. As a result, the processing is resumed.

If it is judged in the step S7 that the cut electric wire is an acceptable product, a count value T in the counter area 522 in the memory 52 is incremented by one (step S10). The processing in the step S6 and the subsequent steps is repeated until the count value T in the counter area 522 reaches a predetermined number Q of measured and processed electric wires.

If it is judged in the step S11 that the count value T in the counter area 522 is Q, the program proceeds to step S12. In the step S12, the processor 11 is stopped. At this time the processing of the wire producing data stored in the area 1 in the FIFO table 521 is terminated, to complete the production of Q measured and processed electric wires. The worker performs processing such as replacement of applicators of the terminal crimpers 14 and 15 as required so as to perform processing of the subsequent electric wire after the processor 11 is stopped.

The wire producing data stored in the area 1 in the FIFO table 521 is then transmitted to the processed area in the memory 72 in the wire producing data file 70. The wire producing data stored in the respective areas in the FIFO table 521 are sequentially shifted. For example, the wire producing data stored in the area 2 is shifted to the area 1, the wire producing data stored in the area 3 is shifted to the area 2, and the wire producing data stored in the area 4 is shifted to the area 3. As a result, at the time point where the shifting is terminated, the wire producing data stored in the area 1 in the FIFO table 521 is replaced with the wire producing data so far stored in the area 2. The program is then returned to the first processing. If it is judged in the step S5 that the start signal is inputted, the production of measured and processed electric wires based on the subsequent wire producing data is started.

In the above described embodiment, such control is carried out that every time an index code is inputted in the step 1, wire producing data to which the index code is attached is read out of the memory 72 (step S2), and the wire producing data read out is stored in the FIFO table 521 (step S3).

The above described control may be replaced with such control that if an index code is inputted, the index code is directly stored in the FIFO table 521, and an index code in the area 1 in the FIFO table 521 is read out and wire producing data corresponding to the index code read out is read out of the memory 72 in the step S6.

In the above described embodiment, description was made of a case where a bar code represents not wire producing data itself but an index code corresponding to the wire producing data. Accordingly, the wire producing data corresponding to the index code is read out of the memory 72 or the like, and the wire producing data read out is stored in the FIFO table 521.

In place of the above described case, a bar code may represent wire producing data itself. In such a case, data read by the bar code reader 41 is wire producing data itself. Accordingly, the wire producing data is directly stored in the FIFO table 521.

Additionally, construction intermediate between the construction described in the present embodiment and such construction that a bar code represents wire producing data itself as described above can be adopted. Specifically, a part of wire producing data is represented by a bar code. Wire producing data excluding the part can be stored with an index code attached thereto in the wire producing data file 70. In this case, data from the bar code reader 41 includes the index code and the part of the wire producing data, and the remaining part of the wire producing data is read out of the memory 72 in the wire producing data file 70.

It is possible to suitably choose which of the above described data is represented by a bar code recorded on a production label in consideration of the capacity of data, the convenience for use, and the like.

Furthermore, data on a production label may be represented using not a bar code but a notation which can be read by an OCR (Optical Character Reader). Alternatively, the data may be represented by a combination of punched holes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electric wire producing control device comprising:

a wire producing data file in which a plurality of wire producing data and a plurality of index codes attached to the respective wire producing data for identifying the wire producing data are registered;

first reading means for reading, from a record medium on which any one of the index codes attached to said respective wire producing data is recorded, the index code;

second reading means for accessing said wire producing data file when the index code read by said first reading means is applied and reading out the wire producing data to which the same index code as the read index code is attached;

storing means capable of storing a plurality of wire producing data for assigning the wire producing data read out by said second reading means priorities and storing the wire producing data, and outputting the wire producing data in the order of descending priorities; and control means for sequentially reading out the wire producing data from said storing means and carrying out control of production processing of electric wires on the basis of the wire producing data read out.

2. The electric wire producing control device according to claim 1, wherein said storing means comprises a first in first out memory for sequentially storing, when the plurality of wire producing data are read out by said second reading means, the wire producing data in the order read out and sequentially outputting the wire producing data in the order stored.

3. The electric wire producing control device according to claim 1, wherein said wire producing data file registers, when data related to electric wires to be produced is inputted, the data as wire producing data, and attaches to the registered wire producing data an index code for identifying the wire producing data, and outputs a record medium on which the index code is recorded.

4. The electric wire producing control device according to claim 2, wherein said wire producing data file registers, when data related to electric wires to be produced is inputted, the data as wire producing data, and attaches to the registered wire producing data an index code for identifying the wire producing data, and outputs a record medium on which the index code is recorded.

5. The electric wire producing control device according to claim 1, wherein said record medium is predetermined paper, said index code is recorded using a bar code, and said reading means comprises a bar code reader.

6. The electric wire producing control device according to claim 2, wherein said record medium is predetermined paper, said index code is recorded using a bar code, and said reading means comprises a bar code reader.

7. The electric wire producing control device according to claim 3, wherein said record medium is predetermined paper, said index code is recorded using a bar code, and said reading means comprises a bar code reader.

8. The electric wire producing control device according to claim 4, wherein said record medium is predetermined paper, said index code is recorded using a bar code, and said reading means comprises a bar code reader.

9. A processor connected to and controlled by said electric wire producing control device according to claim 1, comprising electric wire feeding means for feeding an electric wire, electric wire cutting means for cutting the electric wire fed by said electric wire feeding means, stripping means for removing insulative sheaths at both ends of the electric wire cut by said electric wire cutting means, and terminal crimping means for crimping terminals against both ends of the electric wire from which the insulative sheaths are removed by said stripping means.

10. A processor connected to and controlled by said electric wire producing control device according to claim 2, comprising electric wire feeding means for feeding an electric wire, electric wire cutting means for cutting the electric wire fed by said electric wire feeding means, stripping means for removing insulative sheaths at both ends of the electric wire cut by said electric wire cutting means, and terminal crimping means for crimping terminals against both ends of the electric wire from which the insulative sheaths are removed by said stripping means.

11. A processor connected to and controlled by said electric wire producing control device according to claim 3, comprising electric wire feeding means for feeding an electric wire, electric wire cutting means for cutting the electric wire fed by said electric wire feeding means, stripping means for removing insulative sheaths at both ends of the electric wire cut by said electric wire cutting means, and terminal crimping means for crimping terminals against both ends of the electric wire from which the insulative sheaths are removed by said stripping means.

12. A processor connected to and controlled by said electric wire producing control device according to claim 4, comprising electric wire feeding means for feeding an electric wire, electric wire cutting means for cutting the electric wire fed by said electric wire feeding means, stripping means for removing insulative sheaths at both ends of the electric wire cut by said electric wire cutting means, and terminal crimping means for crimping terminals against both ends of the electric wire from which the insulative sheaths are removed by said stripping means.

13. A processor connected to and controlled by said electric wire producing control device according to claim 5, comprising electric wire feeding means for feeding an electric wire, electric wire cutting means for cutting the electric wire fed by said electric wire feeding means, stripping means for removing insulative sheaths at both ends of the electric wire cut by said electric wire cutting means, and terminal crimping means for crimping terminals against both ends of the electric wire from which the insulative sheaths are removed by said stripping means.

14. A processor connected to and controlled by said electric wire producing control device according to claim 6, comprising electric wire feeding means for feeding an electric wire, electric wire cutting means for cutting the electric wire fed by said electric wire feeding means, stripping means for removing insulative sheaths at both ends of the electric wire cut by said electric wire cutting means, and terminal crimping means for crimping terminals against both ends of the electric wire from which the insulative sheaths are removed by said stripping means.

15. A processor connected to and controlled by said electric wire producing control device according to claim 7, comprising electric wire feeding means for feeding an electric wire, electric wire cutting means for cutting the electric wire fed by said electric wire feeding means, stripping means for removing insulative sheaths at both ends of the electric wire cut by said electric wire cutting means, and terminal crimping means for crimping terminals against both ends of the electric wire from which the insulative sheaths are removed by said stripping means.

16. A processor connected to and controlled by said electric wire producing control device according to claim 8, comprising electric wire feeding means for feeding an electric wire, electric wire cutting means for cutting the electric wire fed by said electric wire feeding means, stripping means for removing insulative sheaths at both ends of the electric wire cut by said electric wire cutting means, and terminal crimping means for crimping terminals against both ends of the electric wire from which the insulative sheaths are removed by said stripping means.

17. An electric wire producing control device comprising:

reading means for reading wire producing data which is recorded on a record medium;

data storing means capable of storing a plurality of wire producing data and assigning, if the wire producing data is read from the record medium by said reading means, the wire producing data its priority for reading and storing the wire producing data; and control means for sequentially reading out the plurality of wire producing data stored in said data storing means in the order of descending priorities for reading and carrying out control of production processing of electric wires on the basis of each of the wire producing data read out.

18. The electric wire producing control device according to claim 17, wherein said record medium is predetermined paper, said wire producing data is recorded using a bar code, and said reading means is constituted by a bar code reader.

* * * * *